United States Patent
Hellberg (10) Patent No.: US 8,086,282 B2
(45) Date of Patent: Dec. 27, 2011

(54) APPARATUSES AND A METHOD FOR REDUCING PEAK POWER IN A TRANSMITTER OF TELECOMMUNICATIONS SYSTEMS

(75) Inventor: Richard Hellberg, Huddinge (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 356 days.

(21) Appl. No.: 12/527,639

(22) PCT Filed: Feb. 26, 2007

(86) PCT No.: PCT/SE2007/050116
§ 371 (c)(1), (2), (4) Date: Aug. 18, 2009

(87) PCT Pub. No.: WO2008/105700
PCT Pub. Date: Sep. 4, 2008

(65) Prior Publication Data
US 2010/0029347 A1    Feb. 4, 2010

(51) Int. Cl.
*H04B 1/38* (2006.01)
(52) U.S. Cl. ........ 455/574; 455/127.5; 375/312
(58) Field of Classification Search ........ 455/127.1, 455/127.5, 572, 574; 375/308, 312
See application file for complete search history.

(56) References Cited

U.S. PATENT DOCUMENTS

| 7,292,656 B2* | 11/2007 | Kloper et al. | 375/340 |
| 7,346,013 B2* | 3/2008 | Garmany et al. | 370/286 |
| 7,369,534 B2* | 5/2008 | Amerga et al. | 370/350 |
| 7,423,994 B2* | 9/2008 | Liu et al. | 370/331 |
| 7,764,726 B2* | 7/2010 | Simic et al. | 375/150 |
| 2003/0086507 A1 | 5/2003 | Kim et al. | |

FOREIGN PATENT DOCUMENTS

| EP | 1 515 504 A1 | 3/2005 |
| WO | WO 03/001697 A2 | 1/2003 |
| WO | WO 2006/068554 A1 | 6/2006 |
| WO | WO 2008/008012 A1 | 1/2008 |

OTHER PUBLICATIONS

International Search Report dated Dec. 21, 2007 (3 pages).
Written Opinion dated Dec. 21, 2007 (9 pages).

* cited by examiner

*Primary Examiner* — Nhan Le
(74) *Attorney, Agent, or Firm* — Myers Bigel Sibley & Sajovec, P.A.

(57) ABSTRACT

The present invention relates to an apparatus (100), a base station (500) and a method for reducing peak power of an input signal (1) using successive processing stages (10). Each stage (10) comprises a peak finder (11) arranged to find at least one peak of the input signal (1) exceeding a threshold level, and to make a list (LO) comprising information on a number of the highest peaks or information on each peak; a peak selector (12) adapted to receive the list (LO) and to receive, from each preceding stage (10), a list (Li) with information on unreduced peaks and the stage number. The peak selector (12) further selects from all lists a peak (P) to be reduced and determines a fractional sample shift value (FSi) of the stage in which the selected peak was found. Each stage (10) further comprises a kernel selector that selects a kernel signal (Ki) that is fractionally sample shifted with the sum of all fractional shift values, starting from the shift value (FSi) up to the present stage. Each stage (10) also comprises a kernel manipulator (14) that manipulates the selected kernel signal based on information on the selected peak (P). Each stage (10) further comprises a combiner (15) that reduces the selected peak (P) by combining the manipulated kernel signal with a delayed version of the input signal (1).

18 Claims, 7 Drawing Sheets

APPARATUSES AND A METHOD FOR REDUCING PEAK POWER IN A TRANSMITTER OF TELECOMMUNICATIONS SYSTEMS

TECHNICAL FIELD

The present invention relates to signal processing in general and to apparatuses and a method for reducing peak power in a transmitter for use in telecommunications systems in particular.

BACKGROUND

In many applications, various communications systems and especially in multi-carrier modulation systems there are requests for non-linear modification of a signal because multi-carrier signals suffer from a high-Peak-to-Average Ratio (PAR). Examples of such multi-carrier systems are Orthogonal Frequency Division Multiplexing (OFDM), Digital Audio Broadcasting (DAB) or Digital Video Broadcasting (DVB) to mention only a few. In many cases, such non-linear modifications have to be kept within a certain bandwidth or within certain spectral mask restrictions. In particular radio signal applications, this ensures that the output signal does not spill over into adjacent channels or exceeds spectral emission limits.

One typical example of such non-linear modification is PAR reduction. PAR reduction increases efficiency and average output power of a peak power limited Power Amplifier (PA). A large PAR brings disadvantages like a reduced efficiency of a Radio Frequency (RF) power amplifier and an increased complexity of analogue to digital and digital to analogue converters. The objective of peak reduction techniques is therefore to reduce the peak amplitude excursions of the output signal while keeping the spectrum expansion within specified limits, such as spectral mask and adjacent channel power ratio (ACPR) specifications, and keeping in-band error within specified limits, so-called error vector magnitude (EVM) specification.

There are many existing prior art solutions dealing with peak power reduction for multi-carrier signals and signal carrier signals.

One prior art approach for reducing the peak power of an input waveform is to implement power clipping. In the power clipping approach, whenever the amplitude of the input signal is lower than a predetermined threshold, the input signal is passed to the output unchanged, and whenever the amplitude of the input signal exceeds the threshold, the output signal is clamped to the threshold level. Of course, the clipping operation destroys some of the information contained in the original signal. However, the user should be able to tolerate this loss of information as along as the threshold is kept sufficiently high.

Decresting is another prior art approach for reducing the peak power of an input waveform, while avoiding the overshooting problems caused by the baseband filter in the power clipper. In this approach, which is suggested in the international patent application WO 03/001697, an error signal is created that represents the amount by which the input signal exceeds a threshold. This error signal is then subtracted from the original input signal in order to form a decrested output signal.

Tone reservation is another method used to reduce peak power of a signal, typically used when an input signal is a multi-carrier signal or a multi-tone signal. In this method, described in J. Tellado-Mourello. "Peak to Average Reduction For Multicarrier Modulation" Dept. of Electrical Engineering of Standford University, pp. 66-99, September 1999, the peak power is reduced by selecting or reserving a subset of a plurality of frequencies that constitute a multi-carrier symbol. These selected or reserved frequencies are used to create an appropriate impulse function, which is scaled, shifted, rotated and subtracted from the input multi-tone signal at each peak of the input signal that exceeds a predetermined threshold. Thus, one or several peaks may be clipped in this fashion and in a single iteration. However, reducing one or more peaks may cause the resulting waveform to exceed the clipping threshold at other positions. Therefore, the process is repeated until a satisfactory peak-to-average reduction is achieved. The impulse function created from the subset of reserved frequencies are usually pre-computed since the subset of reserved frequencies is usually known in advance.

However, when non-linear processing as described in the above prior art forces a signal, such as a time-discrete signal, to stay within certain boundaries, this can generally only be guaranteed at sample instants. As the time-discrete signal (i.e. from digital form) is converted into time-continuous form (i.e into analogue form), peak regrowth occurs and therefore some limiting is needed in the analogue part of the system.

The traditional solution to this problem is to perform from the start the non-linear processing at a sufficiently high rate. In other words, peak regrowth can be avoided if a sufficiently high Over-Sampling Ratio (OSR) is used when starting processing the time-discrete signal. For example, in the tone reservation approach, typically four or higher OSR is usually used to make sure that peak regrowth is effectively avoided. This means that the computational complexity increases. In practical designs, the increase in computational cost is directly proportional to the OSR, and if an OSR of 4 is used, the computational cost increases by a factor of 4 and therefore a substantial increase in hardware and power consumption of a transmitter.

In the pending international patent application PCT/SE2006/050256, a solution is proposed that considerably lowers the computational complexity. In this proposed solution, even though a low OSR (lower than 4) is used, peak regrowth is effectively reduced. This is achieved by applying a fractional sample shift on an output signal from one or several successive processing stages. The basic idea of applying a fractional sample shift on a signal is to delay the signal by a fraction of a sample in or between each processing stage, so that signal samples used in a later stage are placed in-between the sample instants used in a previous stage.

Figure 1:
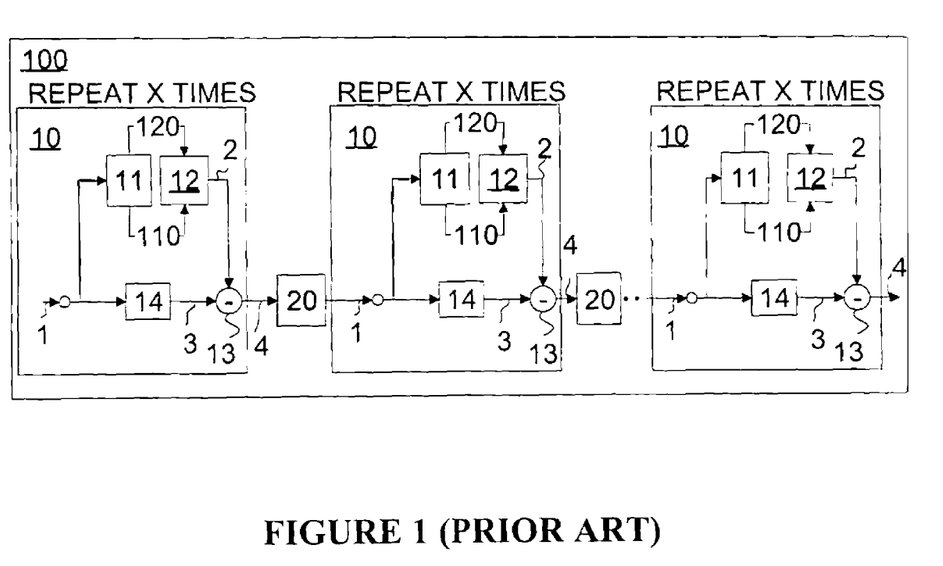
FIG. 1 is a schematic block diagram of an apparatus for reducing peak power according to the solution described in the pending application.

FIG. 1 illustrates the solution proposed in the above mentioned pending application. As shown, a multi-stage non-linear processing of an input main signal 1 is performed. In a first processing stage 10, time-discrete samples of a multi-carrier signal are used as input values. These samples have a certain sample rate and thus a certain inter-sample spacing. Based on a predetermined threshold level A, also known as a clipping level, information on samples exceeding this threshold level is found by passing time-discrete samples of the input signal 1 through a peak finder 11. The information (110, 120) on sample or samples exceeding the threshold level includes: the size of the overshooting part exceeding the threshold level, the phase and the time position of the sample/samples of the overshooting part.

This information (110, 120) is further used to manipulate a kernel previously stored in block 12. The kernel is usually constructed from peak reduction frequencies (or reserved frequencies/tones) of the multi-carrier input signal.

Referring back to FIG. 1, the manipulation of the kernel in block 12, includes a rotation of the kernel signal based on the phase of overshooting part; a scaling of the kernel signal based on the size of the overshooting part, and a shifting of the kernel signal based on the time position of sample/samples of the overshooting part. After manipulation of the kernel signal, the overshooting part of the input signal is reduced by combining the manipulated kernel signal 2 with a delayed version 3 of the input signal. The above mentioned procedure to reduce a peak of the input signal can be repeated X times, depending on the requirement of the system. After that X peak reduction steps have been performed, a fractional sample shift 20 is applied on the peak reduced signal 4. The benefit of using a fractional sample shifting of the signal 4 is to allow a subsequent processing stage 10 to find and reduce peaks that may hide "in-between" samples thus eliminating the need to use a high OSR. The input signal used in the solution described above may be a multi-carrier signal, e.g. an OFDM signal.

Although the computational complexity is effectively reduced using the solution described in the pending application, the randomness of the peaks; in number, size and fractional position; makes it difficult to divide the peak reducing effort into regular batches at different stages. In other words, the randomness of the peaks renders it difficult to exploit the peak reducing effort in a more efficient way.

In addition, choosing a fixed number of peak reducing steps before entering a subsequent stage is suboptimal, since this will either mean that too few peaks are reduced at some stages, or that more peaks than necessary are reduced at most stages. In such a fixed scheme, a certain amount of extra peak reducing steps are required at each stage to make sure that all relevant peaks are reduced prior to entering the next processing stage. The introduction of extra peak reducing steps will therefore require additional computational load.

Furthermore, choosing to end the peak reducing steps at some specific quality level is also suboptimal since the number of peak reducing steps at a certain processing stage will vary between signal blocks (e.g. OFDM blocks). For some blocks, the computational resources will run out in an early stage, so that the later processing stages fail in contributing to the peak reduction. This will result in peak re-growth in the output signal.

SUMMARY

As stated above, even though a low over-sampling ratio is used to counteract peak regrowth and that the computational complexity is reduced, several problems still occur in the solution described above. It is therefore an object of the present invention to solve at least some of the problems listed above such that both peak regrowth and the computational complexity are further reduced hence leading to additional increase in system performance.

According to a first aspect of the present invention, the above stated problem is solved by means of an apparatus for reducing peak power in a transmitter for use in telecommunications systems. The apparatus comprises successive processing stages. Each stage has an input main signal and an output main signal and comprises a peak finder arranged to find at least one peak of the input signal exceeding a predetermined threshold level, and to a make list comprising information on each found peak or information on a number of the largest found peak/peaks. Each stage further comprises a peak selector configured to receive from the peak finder the made list and to receive, from each preceding stage, if any, a list comprising information on unreduced peaks and the stage number. The peak selector is further adapted to select from the above mentioned lists at least one peak to be reduced and to determine the fractional sample shift value of the stage in which the selected peak was initially found. Each stage further comprises a kernel selector adapted to select, for each selected peak to be reduced, a kernel signal that is fractional sample shifted with a fractional sample shift value that is equal to the sum of all fractional shift values, starting from the determined fractional sample shift value up to the present stage. Each stage further comprises a kernel manipulator configured to scale, rotate and cyclically shift the fractionally sample shifted kernel signal based on information on the selected peak to be reduced. Each stage further comprises a combiner adapted to reduce the selected peak by generating a main signal through combination of the scaled, rotated and shifted kernel signal with a delayed version of the input main signal.

According to a second aspect of the present invention, the above stated problem is solved by means of a method for reducing peak power in a transmitter for use in telecommunications systems by non-linear processing of an input main signal using successive processing stages. The method comprises for each stage the steps of: receiving, from each preceding stage, if any, a list comprising information on unreduced peaks and the stage number; finding, in the present stage, at least one peak of the input main signal exceeding a predetermined threshold level and making a list comprising information on each found peak or information on the largest found peak/peaks; selecting, from the lists, at least one peak to be reduced and determining, for each selected peak, the fractional sample shift value of the stage in which the selected peak was initially found. For each selected peak, the method further comprises: selecting, in the present stage, a kernel signal that is fractionally sample shifted with a fractional shift value that is equal to the sum of all fractional sample shift values, starting from the determined fractional sample shift value up to the present stage; scaling, rotating and cyclically shifting the fractionally sample shifted kernel signal based on information on the selected peak; and generating an output main signal by reducing the selected peak, through combination of the scaled, rotated and shifted kernel signal with a delayed version of the input main signal.

According to a third aspect of the invention, the above stated problem is solved by means of a base station, which base station comprises an apparatus that reduces peak power in a transmitter for use in telecommunications systems.

An advantage with the present invention is that the computational load is effectively reduced.

Another advantage with the present invention is that the system performance is improved. Yet another advantage with the present invention is that hardware and power consumption of a base station is reduced.

Other advantages of the present invention will become apparent from the following detailed description, when considered in conjunction with the accompanying drawings, attention to be called to the fact, however, that the following drawings are illustrative only, and that changes may be made in the specific embodiments illustrated and described within the scope of the appended claims.

DETAILED DESCRIPTION

The present invention provides apparatuses and a method for reducing peak power in a transmitter having as input a multi-carrier signal. The apparatus further decreases the computational complexity, power consumption and hardware of the transmitter. This is achieved by applying multiple fractional-sample shifted kernels on a multi-carrier signal through successive processing stages as will be described in conjunction with FIGS. 2-7.

Figure 2:
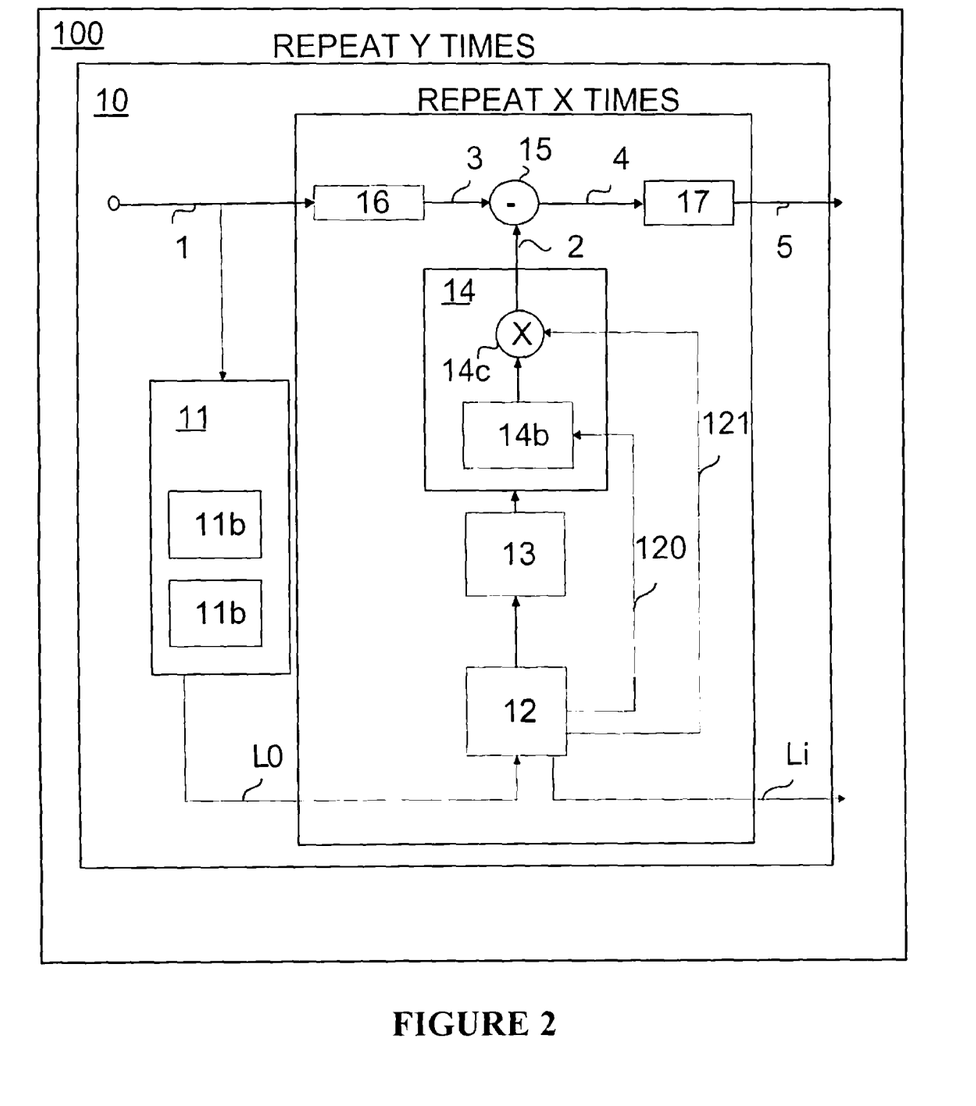
FIG. 2 illustrates a schematic block diagram of a first exemplary embodiment of an apparatus for reducing peak power according to the present invention.

FIG. 2 illustrates an apparatus 100 according to an exemplary embodiment of the present invention where a multi-stage non-linear processing of an input main signal 1 is performed. For ease of viewing and for better understanding the principles of the present invention, the fourth processing stage 10 of apparatus 100 is illustrated in greater details in FIG. 3. Note that apparatus 100 is not restricted to four stages and instead apparatus 100 may contain less than four stages or more than four stages.

Referring to FIG. 2, time discrete samples of a multi-carrier signal 1 are used as input values in a processing stage 10. These samples have a certain sample rate and thus a certain inter-sample spacing. In a first instance, the samples of the input signal 1 are passed through a peak finder 11. Based on a predetermined threshold level A, also known as a clipping level, information on samples exceeding the threshold level is found in block 11a of the peak finder 11. The information on sample/samples of the peak(s) exceeding the threshold level A includes: the size of the peak(s) exceeding the threshold level A, the phase and the time position of the sample/samples of the peak(s). Thus one or several peaks are found in block 11a. In a block 11b of the peak finder 11, a list denoted L0 is generated, comprising the information on each found peak exceeding the threshold level A or information of a number of the largest found peak/peaks. In addition, the number of the present stage 10 may also be added to the generated list 11c. This list L0 is further sent to a peak selector 12.

According to the present invention, in case the processing stage 10 is not the first stage 10 of apparatus 100, the peak selector 12 also receives (see FIG. 3), from each preceding stage 10, a list Li, i=1, 2, . . . n, comprising information on each previously unreduced peak or information on a number of the largest previously unreduced peak/peaks. Each list Li, i=1, 2, 3 may also comprise the stage number where the list was made, i.e. L1 comprises number 1, L2 comprises number 2 and L3 comprises number 3. The peak selector 12 further selects from all lists, i.e. all received lists Li, i=1, 2, . . . , n, and the currently generated list L0, at least one peak to be reduced P. The peak selector 12 also determines for each selected peak P to be reduced, the fractional sample shift value FSi, i=1, 2 . . . , n, of the stage 10 in which the selected peak P was initially found. The determination of the fractional sample shift value FSi is, according to the present invention, based on the number of the stage wherein the selected peak P to be reduced was initially found. The determined fractional sample shift value FSi is further sent to a kernel selector 13, as illustrated in FIG. 2.

Figure 3:
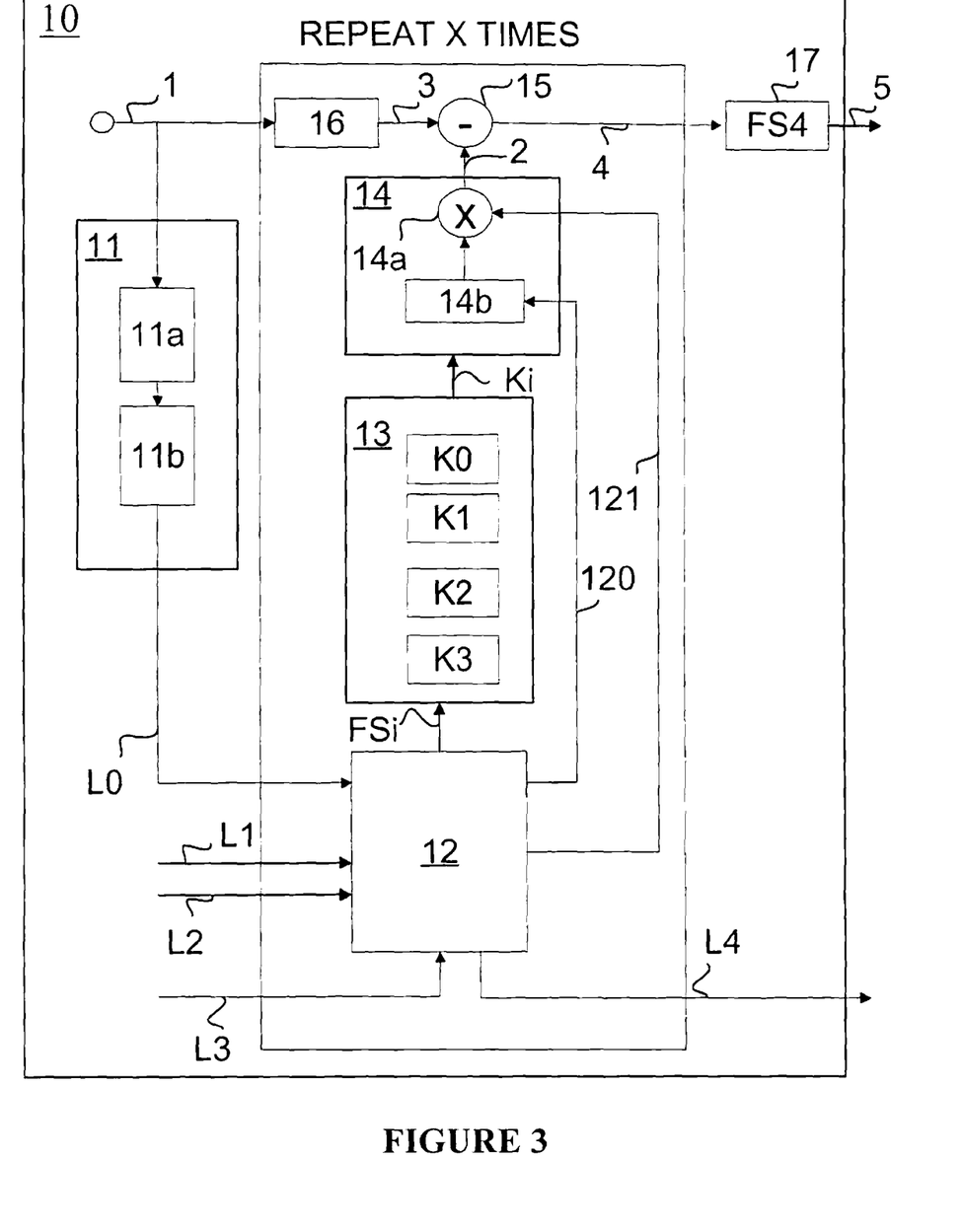
FIG. 3 is a schematic block diagram of an exemplary embodiment of a single stage (the fourth stage) of an apparatus for reducing peak power according to the present invention.

Referring to FIG. 3, which represents the fourth stage 10 of apparatus 100, the kernel selector 13 may select between four kernel signals, labelled K0, K1, K2 and K3 respectively. K0 represents the kernel signal of the present stage which in this case is the fourth stage 10. K1 represents the kernel signal of the first stage of apparatus 100; K2 represents the kernel signal of the second stage of apparatus 100; and K3 represents the kernel signal of the third stage of apparatus 100.

It should be noted that the kernel signals Ki, where i=0, 1, 2, 3 may be pre-constructed or pre-computed and stored in the peak selector 13, or may be generated when needed. The kernel signals Ki, where i=0, 1, 2, 3 may be constructed by many methods and the present invention is therefore not restricted to any specific method of constructing the kernel signals. As an example the kernel signals may be constructed based on reserved frequencies of the input multi-carrier signal. These reserved tones or frequencies may be chosen by any suitable method. As an example, frequencies that are noisy may be utilized since the decrease in data rate of the output signal or output symbol is minimised. The frequencies or tones may also be randomly selected. Alternatively, the subset of reserved frequencies or tones is chosen prior to transmission. This is done to avoid transmitting any side information to a receiver. No special receiver operation is therefore needed. The subset of reserved frequencies may also be reselected during communication depending on the quality of the channel or for any other reason. In this case, the receiver is informed on or originates the subset of reserved frequencies. The reserved frequencies or tones typically do not carry any useful information. Instead, the non-reserved frequencies are allowed to carry useful information. Alternatively, the reserved frequencies may include some type of information which must be decoded by the receiver. It should also be noted that the present invention is not restricted to kernel signals constructed based solely on reserved frequencies, i.e the error due to the clipping of the input signal may also be placed in the data tones of the kernel signal(s).

Referring back to FIG. 3, the kernel selector 13 selects, based on the selected peak P to be reduced, the appropriate kernel signal Ki, i=0, 1, 2 or 3. In case the selected kernel signal Ki is a pre-constructed kernel signal, it has, according to the present invention, already been fractionally sample shifted with a fractional sample shift value that is equal to the sum of all fractional sample shift values, starting from the fractional sample shift value FSi determined by the peak selector 12, up to the present stage 10, but excluding the fractional shift value of the present stage 10 (i.e. in this case the fractional shift of stage 4). Note that the determined fractional sample shift value FSi depends on the stage wherein the selected peak to be reduced was initially found.

In addition, the information (120, 121) on the selected peak P to be reduced, which includes the size (or amplitude), the phase and the time position of the selected peak is further used to scale, rotate, and shift the selected fractionally sample shifted kernel signal K0, K1, K2, or K3 using a kernel manipulator 14.

The operation of manipulation of the kernel signal Ki i.e. the scaling and rotating is performed by a scaling and rotating means 14c, whereas a shifting means 14b is responsible to cyclically shift the selected kernel signal Ki. The scaling of the selected fractionally sample shifted kernel signal Ki includes scaling of the samples of the kernel signal based on the amplitude of the peak to be reduced, such that the samples of the kernel signal have at least one peak of similar size as the size of the peak to be reduced. The rotation of the fractionally sample shifted kernel signal comprises rotating the samples of the kernel signal based on the phase of the sample/samples of the peak to be reduced such that the rotated samples of the kernel are in phase with the samples of the selected peak to be reduced. The cyclical shifting of the kernel signal comprises an integer shifting of the sample/samples of the fractionally sample shifted kernel signal such that the samples of the kernel signal are at the same integer position of the samples of the peak to be reduced.

After determining the scaled, rotated and shifted kernel signal Ki, a delayed version 3 of the input main signal 1 is combined with the manipulated kernel signal 2 using a combiner 15. The resulting signal 4 is an output signal 4 in which peak P has been reduced. A delay means 16 is here applied on the original multi-carrier signal 1 because the processing of finding a peak, setting up a list, selecting a peak to be reduced, selecting a kernel signal and manipulating the kernel signal normally takes some processing time which should be compensated for. It should however be noted that the use of delay means 16 is not a prerequisite for the present invention. After reduction of the selected peak P, the process may be repeated to reduce the next peak(s) from all lists.

As an example, let us assume that the selected peak P to be reduced is the highest peak from all lists L0, L1, L2, L3 and that this highest peak P belongs to the list L1 that was transmitted from stage number 1 of apparatus 100, to the peak selector 12 of the present stage 10. The information needed by the kernel selector 12 to select the appropriate kernel signal is thus the fractional sample shift value of stage 1. i.e. FS1. The kernel selector 12 selects, according to this exemplary embodiment of the present invention, the kernel signal K1. Assuming that this kernel signal K1 is pre-computed (or pre-constructed), it has, according to embodiments of the present invention, already been fractionally-sample shifted with a fractional sample shift value equal to the sum of all fractional sample shift values starting from the fractional sample shift value of the first stage 10 (i.e. where the selected peak was initially found) up to the fractional shift value of the fourth stage 10. In other words, the kernel signal K1 was fractionally shifted with a value equal to FS1+FS2+FS3. This is because the sample/samples of the selected peak P was/were initially at zero fractional sample shift when it was found in stage 1, so it/these sample/samples has/have been shifted to a new fractional sample shift position by all the fractional sample shifts since, i.e. by FS1, FS2, and FS3. Therefore, the kernel signal K1 was fractionally shifted with a value equal to FS1+FS2+FS3.

Next, the fractionally sample shifted kernel signal K1 is scaled, rotated and integer shifted using the information (120, 121) on the selected peak P in list L1.

The rotated, scaled and integer shifted kernel signal K1 is thereafter combined with (or subtracted from) a delayed version 3 of the input signal 1, thus reducing the highest peak P.

For each subsequent peak to be reduced (e.g. the next highest peak), the process is repeated using the appropriate fractionally sample shifted kernel signal K0, K1, K2 or K3 depending on where the subsequent peak to be reduced initially belonged to. For each successfully reduced peak, the information on the peak(s) may be deleted from the corresponding list it/they belonged to.

Referring back to FIG. 2, when a number X of peaks have been reduced, a peak reduced signal 4 is passed to a fractional sample shift means 17 which fractionally sample shifts the peak reduced signal 4 with the fractional sample shift value of the present stage 10. This fractionally sample shifted signal is labelled 5 in FIG. 2. In FIG. 3, FS4 denotes the fractional sample shift value of the fourth stage.

The signal 5 is thereafter used as input signal 1 to the next stage if any. As illustrated in FIG. 2, the number of stages 10 of apparatus 100 is denoted by Y. Note that X is not necessarily equal to Y. Referring back to FIG. 2, the kernel selector 13 of the present stage 10 is further adapted to transmit to a subsequent stage if any, a list Li containing information on each unreduced peak and the stage number of the present stage and/or the fractional sample shift vale FSi used in the present stage. In FIG. 3, the transmitted list is labelled L4.

It should be noted that the number X of peak reductions is not necessarily the same for all Y stages, and depends primarily on the number of peaks that have to be reduced but may also depend on other factors and can be elaborated for the problem at hand or by computer simulations. In addition, the fractional sample shift values of apparatus 100 do not necessarily have the same value. As an example, in case apparatus 100 comprises fractional sample shifts, the fractional sample shift values could be [$\frac{1}{3}$, $-\frac{2}{3}$, $\frac{1}{3}$]. If five shifts are performed, the shifts could be [$\frac{2}{5}$, $-\frac{3}{5}$, $\frac{2}{5}$, $-\frac{3}{5}$, $\frac{2}{5}$]. An apparatus with nine possible shifts out of which eight are used can have shifts of [$\frac{4}{9}$, $-\frac{5}{9}$, $\frac{4}{9}$, $-\frac{5}{9}$, $\frac{3}{9}$, $\frac{4}{9}$, $-\frac{5}{9}$, $\frac{3}{9}$].

Figure 4:
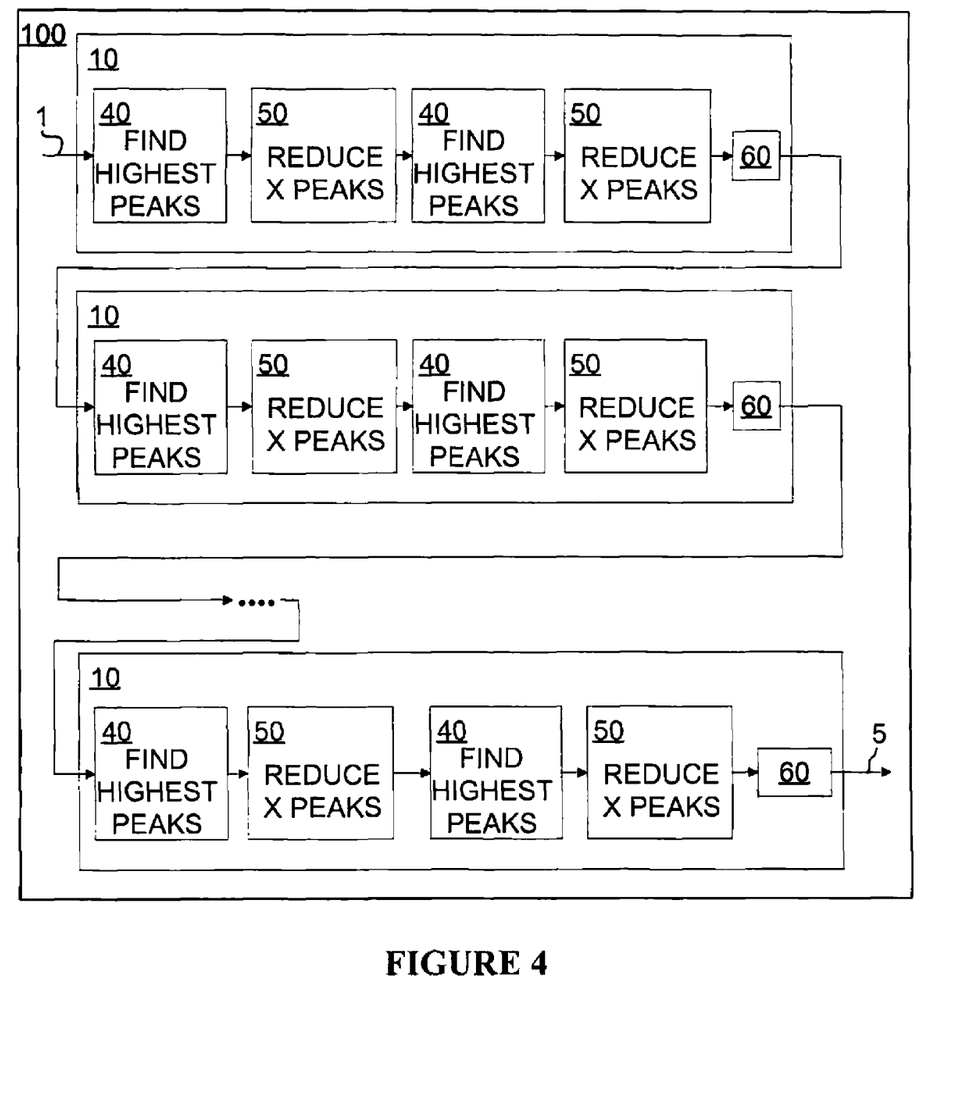
FIG. 4 is a schematic block diagram of a second exemplary embodiment of an apparatus for reducing peak power according to the present invention.

FIG. 4 illustrates another exemplary embodiment of an apparatus 100 according to the present invention. As illustrated, in each stage 10, the highest peaks of the input main signal 1 are found in a peak finder 40 based on a predetermined threshold level A. The peak finder 40 includes, in the present exemplary embodiment of the present invention, the peak finder 11 of FIG. 2 or FIG. 3. As mentioned earlier, the peak finder 40 is also responsible in making a list of all highest peaks that are found and to include the information on each found peak, which includes, the amplitude (or size) of each peak exceeding the threshold level A; the phase and the time position of the sample/samples of each found peak. Each stage 10 further comprises a peak reducer 50 that comprises (not shown) the peak selector 12; the kernel selector 13; the kernel manipulator 14; the combiner 15 and the delay means 16 previously shown in FIG. 2 or FIG. 3. According to this exemplary embodiment, after reduction of X peaks, a new find and reduce operation is performed prior to fractionally sample shifting the peak reduced signal in fractional sample shift means 60. The process is repeated in subsequent stage 10 before an output 5 with a desirable peak to average ratio is achieved.

Compared to the first exemplary embodiment, the computational complexity in this second exemplary embodiment is less when performing the find operations because in this embodiment the highest peaks are found and reduced in each stage 10, which may limit the number of transmitted lists from one stage to the other to only a few. Note that the computational complexity may be higher when performing the peak reduction operations if each of the X peaks is to be reduced in each stage 10. A greater number of peak reduction means 50 thus increases the computational complexity. Therefore, a trade-off must be made between computational complexity and performance. Still, the total number of attacked peaks in each subsequent stage is lowered making apparatus 100 according to the first or second exemplary embodiment more efficient. In addition, the use of a fractionally sample shift 60 in each stage eliminates the need to use a high over-sampling ratio. Furthermore, apparatus 100 according to the embodiments of the present invention is very effective when dealing with a relatively high peak to average ratio(s) since the number of peaks that have to be reduced is low. In other words, the largest the peak to average ratio, the more effective apparatus 100 according to the present invention, performs.

Figure 5:
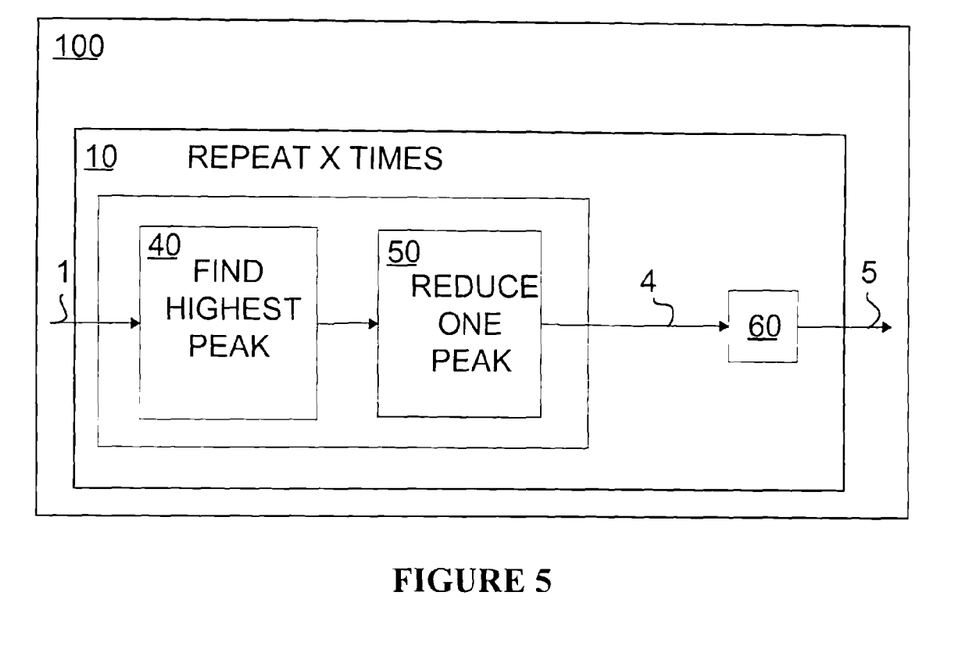
FIG. 5 is a schematic block diagram of a third exemplary embodiment of an apparatus for reducing peak power according to the present invention.

FIG. 5 illustrates another exemplary embodiment of an apparatus 100 according to the present invention. As illustrated, each stage 10 comprises one find and one reduce operation which are repeated X times prior to passing the peak reduced signal 4 to a fractional sample shifting means 60. In FIG. 5, the highest peak is found in peak finder 40 and reduced in peak reducer 50. Next, the next highest peak is found and reduced, and so on. Again, the function of the peak finder 40 and the function the peak reducer 50 are similar to the functions of the previously described peak finder 40 and peak reducer 40 of FIG. 4. In addition all functional blocks (11, 12, 13, 14, 15 and 16) described in FIGS. 2 and 3 are also present in the apparatus 100 of FIG. 5.

It should be noted that in all the above described exemplary embodiments of apparatus 100 of the present invention, the first processing stage 10 has no incoming lists (since it has no previous stage), and subsequent stages generally has one incoming list less than the stage number. In addition, since the peaks found in previous stages are often reduced by later peak reducing operation, the value of the peak information from many stages back is not as high as that of only a few stages back. It is therefore, according to the present invention, possible to reduce the number of transmitted lists, or even remove the least probable peaks of the previous lists. According to the present invention, reduction of transmitted lists may be performed a priori by design or on the fly by evaluating combinations of the peak amplitudes; number of stages since detection, and amplitudes and narrowness of reduced peaks, i.e. a peak or peaks found and reduced in a previous stage lowers the probability of having to reduce very narrow peak(s) (typically within one sample at an OSR=1) in a present stage or in latter stage(s).

Figure 6:
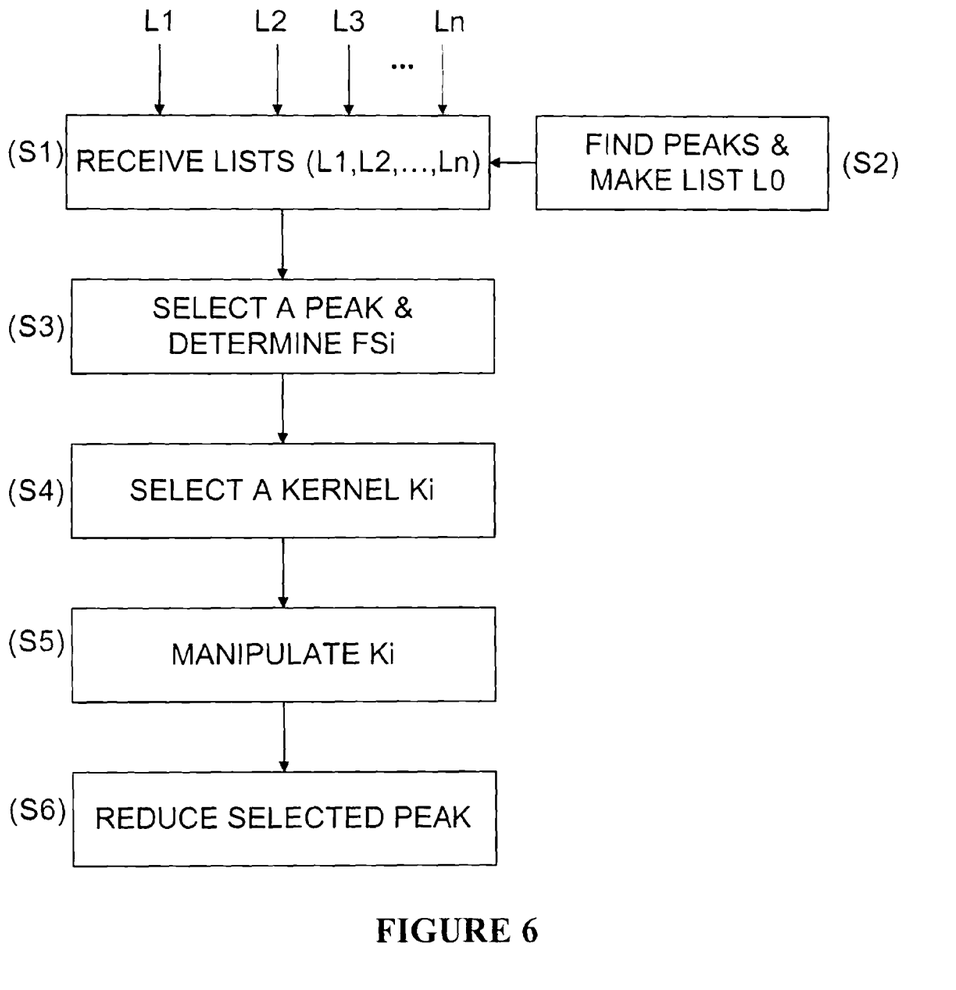
FIG. 6 is a flowchart of a method according to the present invention.

FIG. 6 illustrates a flowchart of a method for reducing peak power in a transmitter by non-linear processing of an input main signal 1 using successive processing stages 10. For each stage 10, the following steps are performed:

At step S1, a list (L1, L2, . . . , Li) comprising information on unreduced peaks and comprising the stage number, is received from each preceding stage 10 if any.

At step 2, at least one peak of the input main signal 1 exceeding a predetermined threshold level is found and a list L0 is made comprising information on each found peak or information on a number of the largest found peak/peaks. The information on the peak/peaks comprises the size of the peak exceeding the predetermined threshold level, the time position (or integer shift position) of the sample/samples of the peak in the input signal 1 and the phase of the sample/samples of the peak in the input main signal 1.

At step 3, at least one peak P to be reduced is selected from all lists, and the fractional sample shift value FSi of the stage in which the selected peak was initially found is determined. According to the present invention, the amplitudes of all peaks in all lists may for example be compared and the highest peak is selected first.

At step 4, a kernel signal Ki (i=0, 1, . . . ) is selected which is fractionally sample shifted with a fractional sample shift value that is equal to the sum of all fractional sample shift values, starting from the determined fractional sample shift value FSi up to the present stage, but excluding the fractional sample shift value of the present stage. According to the present invention, in each stage 10, it is stored a pre-computed and fractionally sample shifted kernel signal of each preceding stage 10.

At step 5, information on the selected peak to be reduced is used to manipulate the selected fractionally sample shifted kernel signal Ki by scaling, rotating and cyclically shifting the fractionally sample shifted selected kernel signal. The scaling of the of the selected kernel signal includes scaling of the samples of the kernel signal based on the amplitude (or size) of the peak, such that the samples of the kernel signal have at least one peak of similar size as the size of the selected peak to be reduced. The rotation of the fractionally sample shifted kernel signal comprises rotating the samples of the kernel signal based on the phase of the sample/samples of the peak to be reduced such that the rotated samples of the kernel are in phase with the samples of the selected peak to be reduced. The cyclical shifting of the kernel signal comprises an integer shifting of the sample/samples of the fractionally sample shifted kernel signal such that the samples of the kernel signal are at the same integer position of the samples of the peak to be reduced.

At step 6, the selected peak P to be reduced is reduced by generating an output signal 4 through combination (or subtraction) of the scaled, rotated and cyclically shifted kernel signal with (from) a delayed version of the input main signal 1.

The method according to the present invention further comprises, fractionally sample shifting the output signal 4 after that at least one peak has been reduced and using the fractionally sample shifted kernel signal 5 as input main signal 1 to a subsequent stage.

In the above described step 3 of selecting a peak to be reduced, the amplitudes of all peaks in all lists are compared and the highest peak is selected. When the highest peak has been reduced, the next highest peak is selected and reduced and so on.

It should be noted that for each reduced peak, the corresponding information on the peak may be deleted from the list it belonged to.

Figure 7:
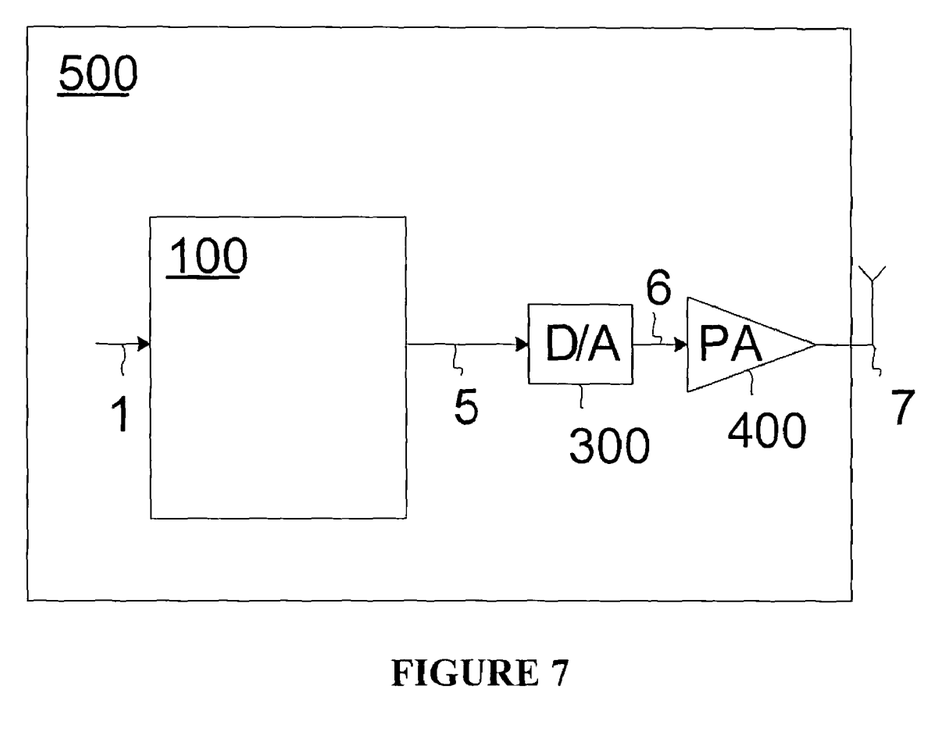
FIG. 7 is a block diagram of an exemplary embodiment of a base station comprising an apparatus according to the present invention.

FIG. 7 illustrates a schematic block diagram of an exemplary embodiment of a base station 500 according to the present invention. As illustrated, the base station comprises an apparatus 100 according to the previously described embodiments of the present invention. In FIG. 7, elements that are not necessary for understanding the present invention have been omitted, such as for instance modulators, filters, encoders and other base station components. According to FIG. 7, an input main signal 1 is forwarded to apparatus 100 in accordance with the present invention. The output signal 5 from apparatus 100 is further converted into a time-continuous signal 6 by passing signal 5 through a digital to analogue converter (D/A) 300. The time continuous signal 6 is then forwarded to a power amplifier (PA) 400, and the output 7 of the PA is finally fed into an antenna prior to transmission.

With the present invention, non-linear processing of an input main signal can be performed using a cascade of processing stages, wherein multiple fractionally sample shifted kernels are used to reduce unreduced peaks found in previous stages and also reduce peaks found in the present stage. According to the present invention the unreduced peak (or peaks) that are higher that the peak (or peaks) found in the present stage may first be reduced in order to minimize the number of peak reduction operations that are needed. This way, better use of the peak reducing resources is achieved, i.e. the computation load is reduced. The hardware and power consumption of a base station that comprises an apparatus 100 according to the present invention is therefore also reduced.

A person skilled in the art appreciates that the present invention can be realised in many ways. The various illustrative logical blocks described in connection with the embodiments disclosed herein may be implemented or performed with a general purpose processor, a digital signal processor (DSP), circuits, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor; the processor may be any conventional processor, processor, microprocessor, or state machine. A processor may also be implemented as a combination of devices, e.g., a combination of a DSP and a microprocessor, a plurality of microprocessors, one or more microprocessors in conjunction with a DSP core, multiple logic elements, multiple circuits, or any other such configuration.

Furthermore, the present invention is applicable in any type of communications systems utilizing multiple carries. By way of example, the invention applies to Orthogonal Frequency Division Multiplexing (OFDM), discrete Multi-Tone (DMT), Asymmetrical Digital Subscriber Line (ADSL), Digital Audio Broadcasting, Discrete Wavelet Multi-Tone (DWMT) or Digital Video Broadcasting (DVB) communications systems.

While the invention has been described in terms several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. An apparatus for reducing peak power in a transmitter for use in telecommunications system, by non-linear processing of an input main signal, where the apparatus comprises successive processing stages, each stage of said apparatus comprises:
   a peak finder to:
      find, in a present stage, at least one peak of said input main signal exceeding a predetermined threshold level, and
      make a list (L0) comprising information on each found peak or information on a number of a largest found peak(s);
   a peak selector to:
      receive, from said peak finder, said list (L0),
      receive, from each preceding stage, if any, a list (Li) comprising information on unreduced peaks and a stage number,
      select, from said lists (L0, Li), at least one peak (P) to be reduced, and
      determine based on said stage number, a fractional sample shift value (FSi) of the stage in which said selected peak (P) was initially found;
   a kernel selector to select, for each selected peak (P) to be reduced, a kernel signal (Ki) that is fractionally-sample shifted with a fractional sample shift value that is equal to a sum of all fractional sample shift values, starting from the determined fractional sample shift value (FSi) up to the present stage (10);
   a kernel manipulator to scale, rotate, and cyclically shift the fractionally-sample shifted kernel signal (Ki) based on information on the selected peak (P); and
   a combiner to reduce at least the selected peak (P) by generating a peak reduced signal through combination of the scaled, rotated, and shifted kernel signal (Ki) with a delayed version of the input main signal.

2. The apparatus according to claim 1 where said information on found peak(s) and said information on said selected peak (P) to be reduced, comprises, the size of the peak of the input main signal exceeding said predetermined threshold level; the position of the peak of the input main signal, and the phase of the peak of the input main signal.

3. The apparatus according to claim 1 where said peak selector is further to:
   compare amplitudes of all peaks in said lists (L0, Li),
   select, at first, the highest peak (P) to be reduced, and
   select from said lists (L0, Li) at least one additional peak to be reduced.

4. The apparatus according to claim 1, further comprising:
   a fractional sample shift means to fractionally sample shift the peak reduced signal to generate a signal that is used as an input main signal to a subsequent stage.

5. The apparatus according to claim 1, further comprising:
   delay means to delay said input main signal.

6. The apparatus according to claim 1, where said kernel selector is further to store a pre-computed and fractionally sample shifted kernel signal of each preceding stage.

7. The apparatus according to claim 1, wherein said peak selector is further adapted to delete information on each successfully reduced peak from the list (L0, Li) to which said peak initially belonged.

8. The apparatus according to claim 1, where said kernel manipulator comprises:
   a scaling and rotating means that is to:
      scale said selected fractionally sample shifted kernel signal (Ki), and
      rotate said fractionally sample shifted kernel signal (Ki) based on the information on said selected peak (P).

9. The apparatus according to claim 1, where said kernel manipulator further comprises:
   a shifting means to cyclically shift said selected fractionally sample shifted kernel signal (Ki) based on the information on the selected peak (P).

10. The apparatus according to claim 1, where said kernel selector is further adapted to transmit to a subsequent stage, if any, a list (Li) comprising information on each unreduced peak in the present stage and comprising the stage number of said present stage and/or comprising the fractionally sample shift value used in said present stage.

11. The apparatus according to claim 1, where the combiner is configured to subtract said scaled, rotated, and shifted kernel signal with a delayed version of the input main signal to reduce the selected peak (P) from the input main signal.

12. A method for reducing peak power in a transmitter by non-linear processing of an input main signal using successive processing stages, where, for each stage (10), said method comprises:
   receiving, from each preceding stage, if any, a list (Li) comprising information on unreduced peaks and comprising a stage number of said preceding stage;
   finding, in a present stage, at least one peak of said input main signal exceeding a predetermined threshold level and making a list (L0) comprising information on each found peak or information on a number of a largest found peak(s);
   selecting, from said lists (L0, Li), at least one peak to (P) to be reduced and determining based on said stage number, a fractional sample shift value (FSi) of the stage in which said selected peak (P) was initially found;
   selecting, in the present stage, a kernel signal (Ki) that is fractionally-sample shifted with a fractional sample shift value that is equal to a sum of all fractional sample shift values, starting from the determined fractional sample shift value (FSi) up to the present stage (10);
   manipulating the selected fractionally sample shifted kernel signal (Ki) by scaling, rotating, and cyclically shifting the fractionally-sample shifted kernel signal based on information on said selected peak (P) to be reduced; and
   generating a signal by reducing said selected peak (P) through combination of the scaled, rotated, and cyclically shifted selected kernel signal with a delayed version of the input main signal.

13. The method according to claim 12 where said information on each found peak and said information on each selected peak (P) to be reduced comprises a size of the peak of the input main signal exceeding said predetermined threshold level; the integer shift position of the peak within the input main signal; a phase of the peak; a number of the stage in which the peak was initially found; and a value of the fractional sample shift (FSi) used in said stage.

14. The method according to claim 12, where the selecting a peak (P) to be reduced comprises:
    comparing amplitudes of all peaks from all lists (L0, Li), selecting, at first, a highest peak (P) to be reduced and selecting at least one additional peak to be reduced.

15. The method according to claim 12, further comprising:
    fractionally sample shifting said generated signal by the fractional sample shift value of the present stage to generate a signal that is used as an input main signal to a subsequent stage.

16. The method according to claim 12, where the manipulating the selected fractionally sample shifted kernel signal (Ki) comprises:
    scaling samples of the selected kernel signal (Ki) based on information on a size of the selected peak to be reduced, such that the samples of selected kernel signal (Ki) have at least one peak of similar size as the size of the peak (P) to be reduced.

17. The method according to claim 12, where the manipulating the selected fractionally sample shifted kernel signal (Ki) comprises:
    rotating samples of the selected kernel signal (Ki) based on a phase of the peak to be reduced such that the rotated samples are in phase with the peak (P) to be reduced; and
    cyclically shifting the selected kernel signal (Ki), using an integer shift position of the peak (P) to be reduced, such that at least one peak of the selected kernel signal (Ki) is at a same position as a position of the peak (P) to be reduced.

18. The method according to claim 12, where the generating the signal comprises:
    subtracting the scaled, rotated, and cyclically shifted selected kernel signal from a delayed version of the input main signal.

\* \* \* \* \*